UNITED STATES PATENT OFFICE.

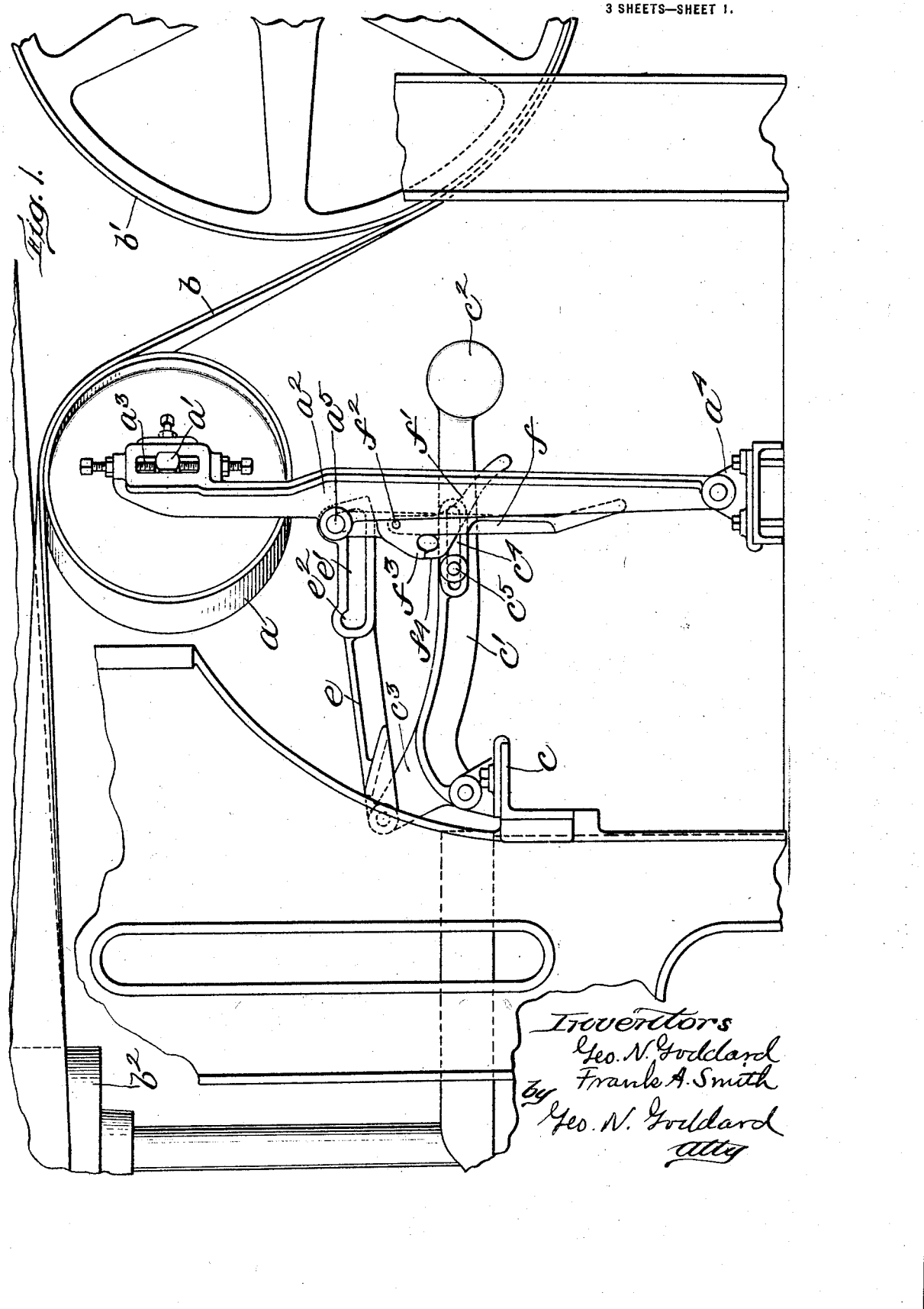

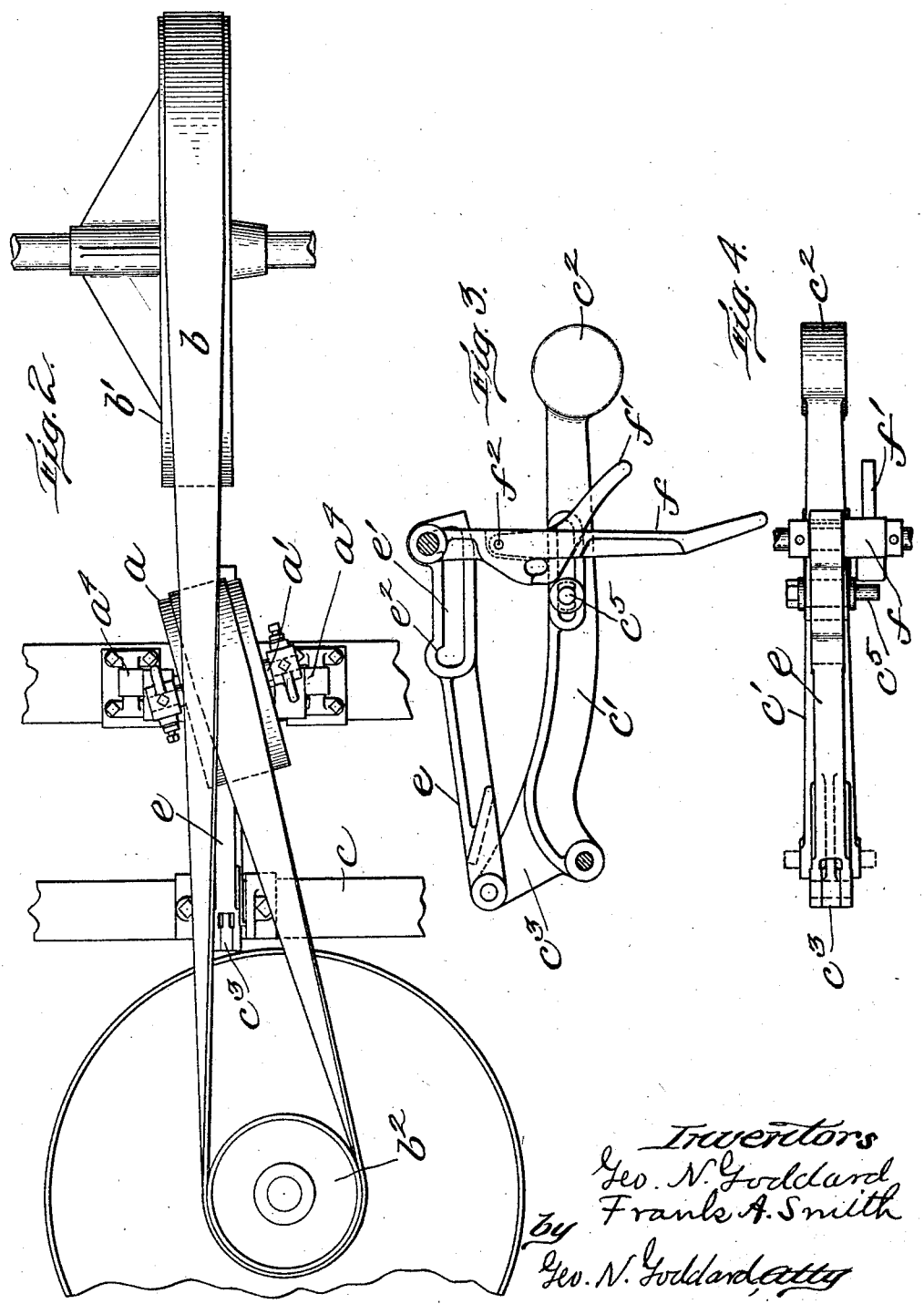

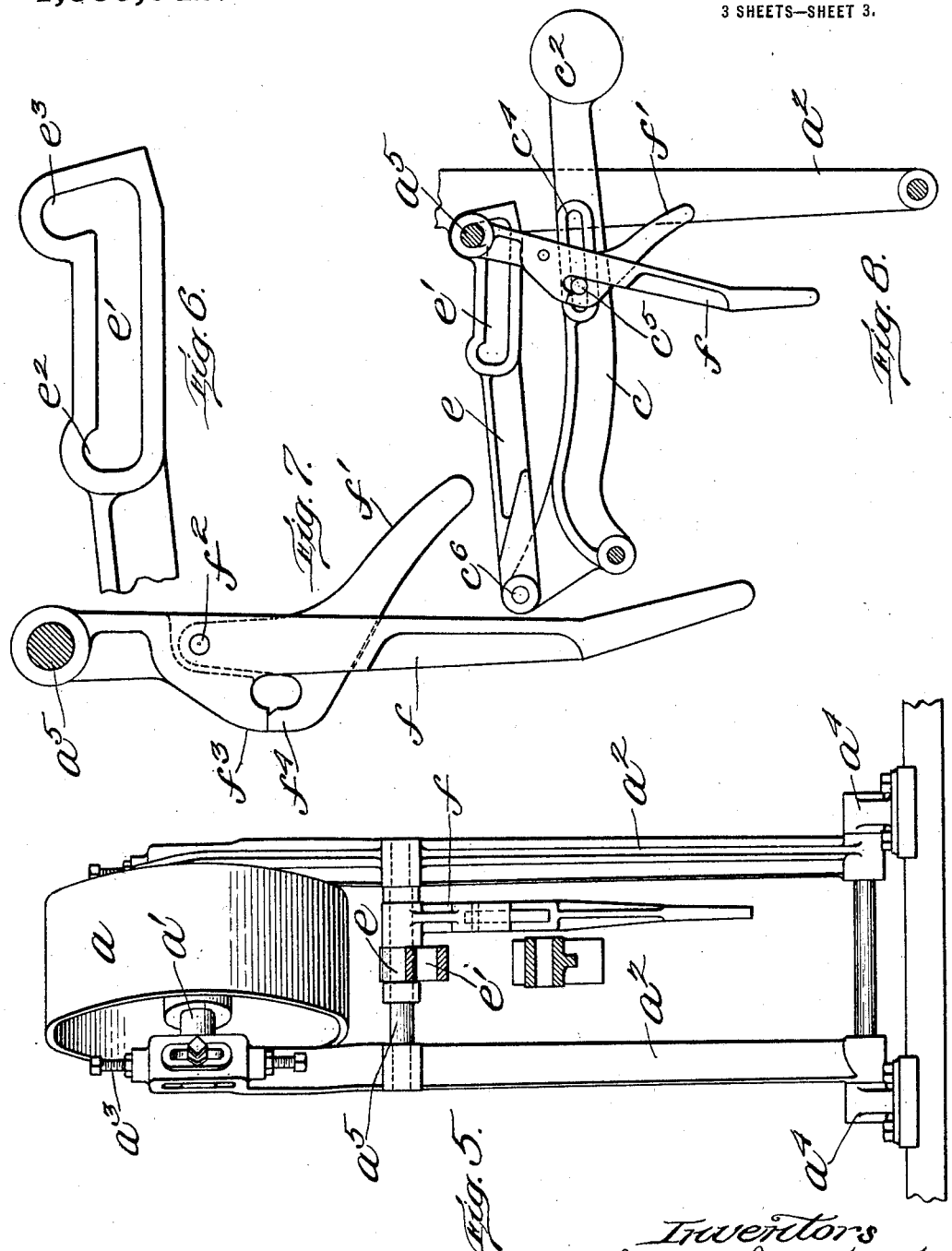

GEORGE N. GODDARD, OF NEWTON, AND FRANK A. SMITH, OF READING, MASSACHUSETTS, ASSIGNORS TO AMERICAN TOOL & MACHINE COMPANY, OF BOSTON, MASSACHUSETTS, A CORPORATION OF MASSACHUSETTS.

AUTOMATIC BELT-TIGHTENER.

1,385,942.  Specification of Letters Patent.  Patented July 26, 1921.

Application filed September 15, 1919. Serial No. 323,917.

*To all whom it may concern:*

Be it known that we, GEORGE N. GODDARD, a resident of Newton, in the county of Middlesex and Commonwealth of Massachusetts, and FRANK A. SMITH, a resident of Reading, in the county of Middlesex and Commonwealth of Massachusetts, both citizens of the United States, have invented certain new and useful Improvements in Automatic Belt-Tighteners, of which the following is a specification.

This invention relates to belt tighteners for use in automatically taking up the slack or stretch of driving belts and is herein shown and described in its application to the driving belt of a centrifugal machine.

The object of the invention is to produce a device of this kind which shall be absolutely reliable and certain in its normal operation and which shall be capable of quick and easy adjustment into inoperative position for the purpose of permitting easy access to substitute a new belt or re-lace an old belt with suitable provision for positively locking the mechanism during such operation of substitution or re-lacing so as to avoid all danger of trouble or injury that might occur from the accidental release of the tightener before the belt is ready to operate.

To this end the invention comprises essentially a weighted lever having a direct single link connection with the movable arm supporting the idler pulley which keeps the belt taut, said link and the pulley supporting frame being formed to have a two-fold interlocking engagement with each other in combination with a detachable latch for holding the weight-arm against normal operative movement.

This and other features of the invention will be more particularly described in the following specification and will be defined in the claims hereto annexed.

In the accompanying drawings is illustrated the preferred form embodying the principles of this invention in which:

Figure 1 is a side elevation of the belt tightener mechanism in its relation to the driving belt of a centrifugal machine.

Fig. 2 is a plan view thereof.

Fig. 3 is a detail of the weight-arm link and latch construction in their normal position when the device is acting to tighten the belt.

Fig. 4 is a plan view of the part shown in Fig. 3.

Fig. 5 is a front elevation of the tension or idler belt and its supporting frame.

Fig. 6 is a detail view of the forward end of the frame engaging adjustable link.

Fig. 7 is a detail view showing the locking latch and dog.

Fig. 8 is a side elevation of the link, weight arm and the latch showing the parts locked in inoperative position.

In the practice of the invention according to the form illustrated in the drawings the tension or idler pulley $a$ is mounted in adjustable boxes $a'$ at the upper ends of the swinging frame which supports the pulley comprising two substantially parallel vertical arms $a^2$ provided at their upper ends with suitable slots $a^3$ to receive the adjustable boxes by which the pulley is rotatably supported. This frame is pivoted at its lower end to suitable blocks attached to the floor or platform as shown at $a^4$. The belt $b$ is shown passing over the idler tension pulley $a$ from the driving pulley $b'$ to the driven pulley $b^2$ of the centrifugal.

The two arms $a^2$ of the frame are connected a short distance below the pulley by the cross-bar $a^5$ which serves as a support for the pivotal latch member $f$ and which also forms the engaging member with the connecting link $e$ as will be hereinafter explained.

On a suitable bracket or support $c$ is pivoted a weight-lever $c'$ carrying at its outer free end preferably a weight $c^2$, and having a short angularly projecting arm $c^3$. The intermediate portion of this lever is provided with a slot at $c^4$ in which is adjustably secured a pin $c^5$ which is so located in the slot $c^4$ as to be engaged by the latch $f$ to hold the weight-arm against dropping of its own weight in order to render the weight-arm temporarily inoperative.

The short arm $c^3$ of the weight arm is pivotally connected at $c^6$ with a connecting link $e$ whose forward end is provided with a slot $e'$ formed at its two ends with notches or recesses $e^2$, $e^3$. This slot $e'$ receives or incloses the cylindrical cross-bar $a^5$ of the swinging idler pulley frame which is adapted to fit into both notches $e^2$ and $e^3$ in order to form an interlocking engagement with either of them as may be desired.

On cross-bar $a^5$ along side of the slot link $e$ is pivotally suspended a latch member $f$ which carries a pivoted dog $f'$ supported thereon by the pivot pin $f^2$. The latch and the dog are formed with coöperating jaws $f^3$, $f^4$ to engage or pass around a horizontal pin $c^5$ which is detachably and adjustably clamped to the slot $c^4$ of the weight arm $c'$.

Suppose it be desired to pass a belt from the driving pulley $b'$ to the centrifugal pulley $b^2$ over the tension pulley $a$. In that case the weight-arm is easily lifted by seizing its forward or weight end $c^2$ and raising it with one hand while the pivotal dog $f'$ is opened to allow the latch mechanism to swing into interlocking engagement around the stop pin $c^5$. Either before or after securing the latch the link $e$ is raised to disengage the cross-bar $a^5$ from the forward notch $e^3$ and the pulley frame is then swung to the rear into engagement with the rear notch $e^2$. The pivotal latch construction prevents the weight-arm from dropping down while the notched engagement of the link $e$ with the bar $a^5$ of the frame holds the pulley well retracted from the normal line of the belt so as to afford ample room for passing the belt over the outer pulley and lacing or fastening its ends while the pulley is in this inoperative position.

After the ends of the belt are fastened together the latch mechanism $f'$ is released from the weight-arm to allow the weight to press the pulley forward against the belt so as to take up any slack or stretch in the belt, the link having first been shifted to its forward position of interlocking engagement with the movable pulley frame.

It will be seen that the construction described affords a single rigid connecting link by which the weight is transmitted with increased leverage to the pulley frame without danger of accidental release or buckling while the pulley frame itself is easily and quickly shiftable from operative to inoperative position by merely raising the front end of the link to permit engagement with the other notch. Moreover, the parts are all operated conveniently from the front of the machine by the attendant where they are most accessible to his reach and where, moreover, the application of the least effort is required to effect the shifting movements for adjusting the mechanism.

What we claim is:

1. In an automatic belt tightener the combination of a movable idler pulley supporting frame, an independently supported weight-arm, a link pivotally connected at its rear end to an appropriate part of said weight-arm and having at its forward end a plurality of notches arranged to engage and position said pulley frame and to keep the pulley pressed against the belt to take up the slack thereof, substantially as described.

2. In an automatic belt tightener the combination of a belt engaging idler pulley, a swinging supporting frame therefor, an actuating lever for pressing the pulley normally against the belt to keep it taut, a connecting link one end of which is pivotally connected to the actuating lever the other end of said link having direct adjustable engagement with the pulley frame in order to transmit power from the actuating lever to the pulley frame and to position the pulley at different distances from the normal path of the belt, substantially as described.

3. In an automatic belt tightener the combination of the swinging frame and its belt engaging idler pulley, a weighted lever pivotally supported to allow its free end to drop by gravity, a slotted link one end of which is pivotally connected to a short arm of said lever, the other end being formed with a slot having a plurality of pin-engaging notches, and a pin mounted in the pulley frame to pass through said slot in position to engage either of said notches whereby the movement of the weight lever is transmitted to the swinging frame, substantially as described.

4. In an automatic belt tightener the combination of the swinging frame and its pulley, an actuating lever for positioning the pulley to maintain tension against the belt, a connecting link pivotally connected at its rear end to the actuating lever and at its forward end having adjustable engagement with the pulley frame, a latch device pivotally mounted on the pulley frame and a latch-engaging member mounted on the actuating lever in position to be engaged by the latch when the free end of the actuating lever is raised, substantially as described.

5. The combination of the swinging frame and its idler pulley, a weight-arm pivotally mounted to move the pulley normally into tension engagement with the belt, a link pivotally connected with said lever and having adjustable connection with the swinging frame, a pivoted latch mounted on said swinging frame, a pivoted dog carried by said latch, a locking pin mounted on said lever in position to be engaged and held by said latch and dog when the free end of the lever is raised, substantially as described.

6. The combination with the swinging frame and its idler pulley, a weighted lever pivotally mounted adjacent thereto, a connecting link pivotally attached at one end to said lever and at the other having an adjustable engagement with said swinging frame, a locking pin adjustably mounted in the weight lever, and a latch device pivotally mounted on the frame in position to engage and retain said locking pin when the free end of the weight lever is raised, substantially as described.

7. The combination of the idler pulley and its swinging frame, an actuating lever pivotally mounted adjacent thereto, a slotted adjustable link having pivotal connection with the weight-arm and adjustable pivotal engagement with said frame, a locking member mounted on said weight-arm, a pivoted latch comprising a swinging lever and a dog pivotally connected therewith and provided with a projecting handle said dog and latch being pivotally recessed to form an interlocking engagement with the locking member carried by said lever, substantially as described.

In witness whereof we have hereunto set out hands this 29th day of July, 1919.

GEORGE N. GODDARD.
FRANK A. SMITH.